United States Patent [19]
Piotrowski

[11] Patent Number: 5,326,114
[45] Date of Patent: Jul. 5, 1994

[54] QUICKLY INTERCHANGEABLE CHUCK WITH MECHANICAL POWER ASSIST CLAMPING CAPABILITIES

[75] Inventor: Tadeusz W. Piotrowski, Cincinnati, Ohio

[73] Assignee: Cincinnati Milacron, Inc., Cincinnati, Ohio

[21] Appl. No.: 865,380

[22] Filed: Apr. 8, 1992

[51] Int. Cl.⁵ .............................................. B23B 31/32
[52] U.S. Cl. .................................. 279/4.05; 279/2.05
[58] Field of Search .................. 279/4.05, 2.05, 2.06, 279/2.09

[56] References Cited

U.S. PATENT DOCUMENTS

| | | |
|---|---|---|
| 2,462,501 | 2/1949 | Hohwart . |
| 2,582,680 | 1/1952 | Church . |
| 2,634,991 | 4/1953 | Stevens . |
| 2,824,744 | 2/1958 | Peters . |
| 3,271,853 | 9/1966 | Pfister . |
| 3,600,777 | 8/1971 | Ollearo . |
| 3,604,083 | 9/1971 | Antonietto . |
| 3,691,899 | 9/1971 | Antonietto . |
| 3,994,061 | 11/1976 | Tomita et al. . |
| 4,067,586 | 1/1978 | Morawski . |
| 4,288,998 | 9/1981 | Schnur et al. . |
| 4,309,809 | 1/1982 | Yokoe et al. . |
| 4,355,446 | 10/1982 | Shimajiri et al. . |
| 4,512,068 | 4/1985 | Piotrowski . |
| 4,662,043 | 5/1987 | Stone et al. . |
| 4,777,713 | 10/1988 | Kitamura . |

OTHER PUBLICATIONS

Pratt Burnerd America "The Most Advanced Power and Manual Chucks in the Industry, Jun. 1990".
Aros Elmec Super Lock.
Price List from Pratt Burnerd America, dated Feb. 5, 1990.
Advertising Brochure entitled "Power Draw Bars" from A. Ott Kempten.

*Primary Examiner*—Timothy V. Eley
*Attorney, Agent, or Firm*—Dinsmore & Shohl

[57] ABSTRACT

A quick-change chuck includes a power-assist clamp feature for use in a machine tool having a powered draw bar. The chuck body includes inner and outer faces with a bore formed therethrough. A tapered polygon alignment pin extends inwardly from the inner face to center the chuck on a longitudinal axis of the machine tool. An axially-movable member is supported by the body for reciprocation along the longitudinal axis, and jaws which move radially as the axially movable member is reciprocated, are connected to the movable member for receiving and clamping a workpiece. The jaws are normally spring-biased to a preload or clamped position. A clamping stud is also connected to the movable member for receiving the draw bar gripping fingers. An initial stroke of the powered draw bar pulls the stud and registers the chuck onto the machine tool, and further stroke in the same direction displaces the clamping stud and movable member to provide the power-assist clamping to the workpiece.

14 Claims, 6 Drawing Sheets

QUICKLY INTERCHANGEABLE CHUCK WITH MECHANICAL POWER ASSIST CLAMPING CAPABILITIES

BACKGROUND OF THE INVENTION

In machine tool operations, it is often necessary or desirable to provide a clamping chuck with automatic power clamping capabilities to insure adequate holding power for workpieces undergoing difficult and/or high speed machining. For example, power chucks having chuck jaws powered by hydraulic fluid or air pressure to provide clamping force for workpieces have been available in the industry from a variety of sources.

Some power chucks are designed for use on machines having hydraulic ports formed in the spindle nose, while others are provided as self-contained units complete with their own pressure gauge, pressure regulator, lubricator, filters, lines, fittings and the like. While such arrangements may be adequate in certain applications, (e.g., dedicated machines where the nature and size of the workpieces remain fairly constant, and interchange of the chuck devices themselves are infrequent), in situations where a machine tool is utilized for a variety of machining applications and/or the type, size, or other qualities of the workpieces vary rather frequently, power chucks requiring hydraulic or pneumatic pressure can create substantial obstacles to applicability, efficiency, manufacturing speed, and cost optimization. Such power chucks are also relatively complex, cumbersome, and expensive. All these factors add to the cost of obtaining, utilizing, and maintaining machine tools, and add to the costs of production of end products.

One common form of mechanical clamping device is the diaphragm chuck. Conventional diaphragm chucks generally include a plurality of clamping jaws affixed to a flexible diaphragm member. The jaws are normally spring-biased to either their "open" or "closed" position. A suitable actuator, such as a hydraulic or pneumatic cylinder is utilized to selectively axially flex the diaphragm in order to cause slight radial movement of the jaws to alternately firmly grip or release a workpiece on the chuck. Thus, these chucks are (a) normally closed and powered open; or (b) normally open and powered closed.

As with the power chuck arrangements, where workpieces of varying sizes or shape are to be chucked, a chuck having a different size diaphragm/jaw arrangement must normally be substituted. A diaphragm chuck of the normally closed and powered open type is shown in U.S. Pat. No. 2,462,501, which issued to G. Hohwart et al. The Hohwart et al. diaphragm chuck incorporates the use of hydraulic fluid to "spring" the diaphragm in order to release the jaw assemblies from gripping position, and relies upon the inherent spring action of the diaphragm to return the jaws to an original clamping position upon release of the hydraulic force.

U.S. Pat. No. 4,067,586, which issued to L. Morawski, illustrates a diaphragm chuck having a plurality of jaws fixed on a diaphragm to receive and cooperate with various workpiece clamping rings. In a manner similar to the Hohwart et al. diaphragm chuck, the Morawski chuck incorporates the use of pneumatic pressure to flex the diaphragm in order to release the workpiece from the jaws. When the air pressure is withdrawn, the Morawski device returns to its original clamping position. Clamping rings of different sizes can be substituted to accommodate various sizes of workpieces. As discussed above, however, the Morawski and Hohwart devices suffer from the inherent problems of complexity, cost, and cumbersomeness as a result of their requirement for pneumatic and/or hydraulic pressure lines to actuate their flexible diaphragms.

A workpiece holding chuck of the normally open and powered closed type utilizing pneumatic pressure to provide power assisted clamping force is shown in U.S. Pat. No. 2,582,680, which issued to A. Church. In the Church holding chuck, pneumatic pressure is utilized to inflate a bag structure which, in turn, flexes a diaphragm to tighten the normally open jaws onto the workpiece.

U.S. Pat. No. 2,824,744, which issued to J. Peters, illustrates a collet chuck wherein one or more bellows-like annular collets are compressed axially to provide clamping pressure in a radial direction. Particularly, the Peters flexible collet chuck arrangement is described as including a draw bolt which is threaded to a connector, which, in turn, is screw threaded for connection to a draw bar. The draw bar may further extend to a fluid pressure draw bar actuator at the opposite end of the spindle. Consequently, while this arrangement might be useful for gripping cylindrical shapes of relatively consistent size, it is not easily adaptable to conditions requiring relatively frequent and quick exchanges of clamping chucks, as is often required in modern machine tool operations.

Consequently, heretofore there has not been available a quickly interchangeable clamping chuck which remains passively clamped during chuck interchange procedures and is actively further clamped when the chuck is positioned at the machine work position. Moreover, there has not been available a relatively simple, reliable, exchangeable clamping chuck having the aforesaid combined passive and active clamping features, which can accommodate applications requiring mechanical power assist utilizing a draw bar assembly which remains at the machine work position.

DISCLOSURE OF THE INVENTION

It is an object of the invention to obviate the above-described problems and shortcomings in interchangeable chucks for machine tools heretofor available in the industry.

It is another object of the present invention to provide an improved quickly interchangeable chuck wherein the gripping jaws are passively biased to hold a workpiece in clamped position throughout a chuck excursion from a loading station to a machining station and vice versa, and wherein the chuck jaws are further powered to actively clamp the workpiece for machining procedures requiring additional clamping pressure.

It is yet another object of the present invention to provide an easily adaptable and quickly interchangeable machine tool chuck having clamping jaws normally biased to a closed clamping position with a workpiece, and wherein the jaws can be actively power assisted to more tightly hold a clamped workpiece in a simple and efficient manner.

It is also an object of the present invention to provide a quickly interchangeable machine tool chuck which remains passively clamped during chuck interchange procedures and is actively further clamped when the chuck is positioned at a machine work position, and which utilizes a draw bar arrangement which remains at the machine work position, without requiring additional specific sources of hydraulic, pneumatic, or other pressure or power connections to the chuck.

It is another object of the present invention to provide a quickly interchangeable chuck which can be easily adapted for internal or external gripping applications.

It is also an object of the present invention to provide an improved quickly interchangeable chuck and draw bar arrangement which can be easily alternated between applications requiring mechanical power assist clamping and applications which do not require such power assist.

In accordance with one aspect of the present invention, there is provided a quickly interchangeable clamping chuck including power assist clamping capabilities for use in a machine tool having a draw bar with a releasable gripping device and which is reciprocable along a longitudinal axis. The chuck includes a body having inner and outer faces and a bore extending therebetween, and an alignment device adjacent the inner face for aligning the chuck with the longitudinal axis. An axially movable member is supported for longitudinal reciprocation relative to the body, and at least one workpiece clamping device is connected to the movable member for receiving and clamping a workpiece in use. A clamping stud having inner and outer ends is connected to the movable member such that movement of the clamping stud in an inward direction along the longitudinal axis will correspondingly move the movable member inwardly. A retention knob is preferably located adjacent to the inner end of the clamping stud to receive the draw bar gripping device, whereby an initial stroke of the draw bar clamps the chuck to the machine tool, while further stroke of the draw bar along the longitudinal axis axially displaces the clamping stud and the movable member relative to the bore of the body, thereby further mechanically tightening the workpiece clamping device.

In a preferred embodiment of the present invention, the movable member contacts an axially flexible diaphragm, and the workpiece clamping device includes a plurality of radially movable jaws attached to the diaphragm. The workpiece clamping device is designed to be normally radially biased to a preloaded or clamped position in order to hold a workpiece within the chuck, whereby axial displacement of the clamping stud and movable member works to actively further mechanically tighten the radial clamping forces imposed on the workpiece at the work station.

The passive clamping force imposed by the radially biased clamping device of the chuck adequately supports and clamps a workpiece during chuck/workpiece loading and unloading procedures and excursions between the loading and unloading stations and the work station. For heavy grip or high rpm machining procedures, the additional mechanical power assist can be imposed by further reciprocation of the draw bar at the work station.

In an alternate embodiment, the arrangement of the plurality of radially movable jaws attached to the diaphragm is substituted by a clamping device including a peripheral clamping wedge arrangement connected to a reciprocable piston supported within the chuck body.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
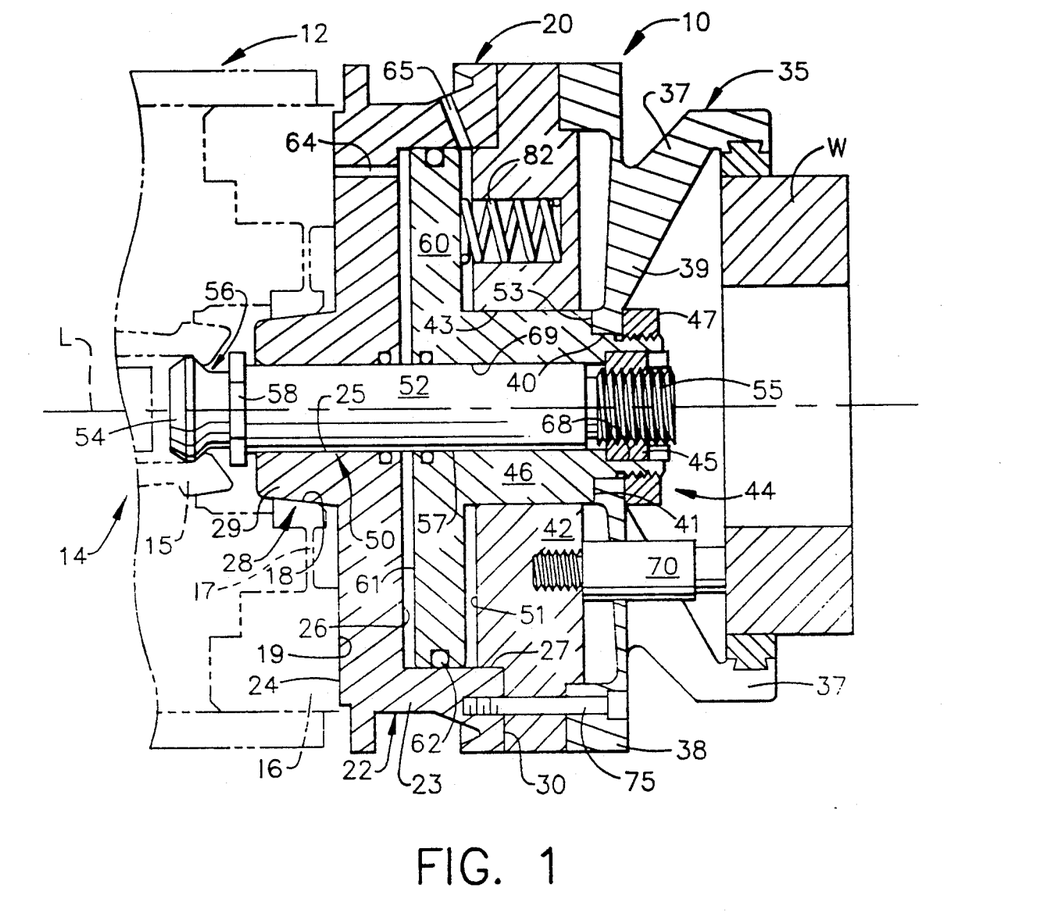
FIG. 1 is a partial cross-sectional view of a quickly interchangeable clamping chuck and draw bar assembly made in accordance with the present invention.

Referring now to the drawings in detail, wherein like numerals indicate the same elements throughout the views, and wherein numerals having the same last two digits (e.g., 10, 110, 210, 310) connote corresponding parts or assemblies between various embodiments, FIG. 1 illustrates details of a preferred clamping chuck 10 and draw bar assembly as utilized with a machine tool spindle 12. Spindle 12 is illustrated as a relatively standard machine tool device having a draw bar mechanism 14 with a plurality of releasable gripping devices or fingers 15.

Clamping chuck 10 is shown as including a substantially cylindrical chuck body 20 further comprising a base or adapter 22 having a substantially cylindrical housing 23 with an inner face 24 and outer face 26, and a centrally located throughbore 25. Particularly, outer face 26 is formed as part of a substantially cylindrical recess 27 formed within housing 23. Means (e.g., alignment means 28) are located adjacent inner face 24 for aligning clamping chuck 10 with the longitudinal axis (L) of draw bar mechanism 14 at a machining station of a machine tool. While alignment means 28 could equally comprise any of a variety of arrangements known in the industry (e.g., disappearing alignment pins or the like), it is preferred that alignment means 28 comprise a tapered polygon 29 depending from inner face 24 and aligned with throughbore 25.

Figure 4:
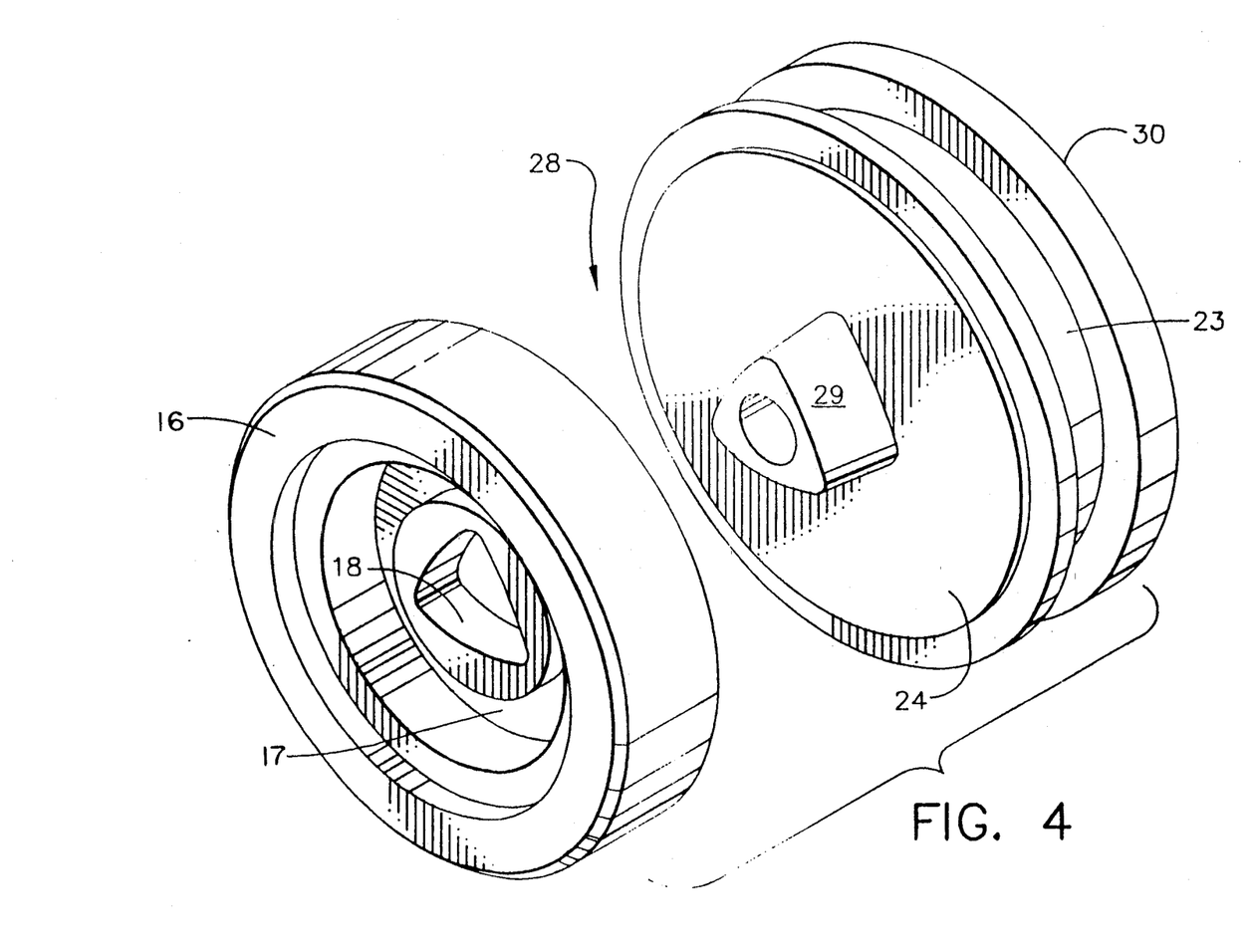
FIG. 4 is an enlarged, partial perspective view of the polygon alignment pin arrangement illustrated in FIGS. 1-3.

As best seen in FIG. 4, the tapered polygon 29 of alignment means 28 will preferably be received within chuck bore 18 of chuck receiver 16, which can comprise a radially rigid yet axially compliant web 17 having a chuck bore 18 for a receiving and aligning clamping chuck 10 on gauge line or locating face 19, such as shown in U.S. Pat. No. 4,512,068. Inner face 24 is thereby automatically properly aligned along axis L adjacent gauge line 19.

Reciprocably seated within cylindrical recess 27 is piston 60, preferably fitted with peripheral O-ring seal 62 as illustrated. Piston 60 can be incorporated in a variety of ways to facilitate the clamping and unclamping procedures of a workpiece W, as will be further discussed below.

Mounted partially within recess 27, and preferably seated upon flange 30 of chuck base 22, is a spacer 42 having a central bore 43 and an upper stop face 41. Spacer 42 can be attached to chuck base 22 by any convenient means, such as by countersunk bolts or the like (e.g., bolt 75 shown as connecting spacer 42, base 22 and clamping device 35).

An axially movable member 44 is supported by chuck body 20, and is illustrated in FIG. 1 as comprising an assembly of an internally threaded nut 45 threadably received over the externally threaded end of shank 52 within recess 68 of sleeve 46, and internally threaded retainer ring 47. At least one workpiece clamping device 35 is preferably supported on chuck body 20, such as via a peripheral support ring 38 fitted onto the upper portions of spacer ring 42, as illustrated. Clamping device 35 further preferably comprises an axially flexible diaphragm 39 and a plurality of cantilevered jaws 37 extending upwardly therefrom. A central bore 40, through which extends the distal portions of sleeve 46, is surrounded by inner periphery 53 of diaphragm 39.

As illustrated in FIG. 1, a clamping stud 50 preferably includes a shank 52 which extends through a substantial part of the aligned through-bore 25 and inner bore 69 of piston 60 within chuck body 20, and an externally threaded distal end 55 for threaded connection with an axially movable member (e.g., 44). Clamping stud 50 can also include an integral outwardly extending hexagonal portion flange 58 which provides wrench flats to facilitate assembly and adjustment procedures. Retainer ring 47 is tightened down onto the distal outer end of sleeve 46 to retain and provide a predetermined amount of inward radial bias to cantilevered jaws 37.

As will be appreciated, the predetermined inward bias of the jaws 37 will enable clamping device 35 to receive and initially clamp a workpiece W in clamped position, wherein the passive radial bias of jaws 37 will safely maintain workpiece W in clamped position for loading and unloading procedures and chuck excursions to and from work stations of the machining process, as well as for light grip or low rpm machining operations. Clamping stud 50 further comprises a pull stub or retention knob 54 having a clamping recess or groove 56 or similar quick release means attached adjacent its inner end for receiving a draw bar gripping device (e.g., gripper finger 15).

An initial phase of the stroke of draw bar mechanism 14 will thereby clamp chuck 10 against gauge line 19 of spindle 12 for machining operations. Moreover, due to the axially movable nature of clamping stud 50 and movable member 44, a second phase or further stroke of draw bar mechanism 14 in the same inward direction along longitudinal axis L will axially displace stud 50 and movable member 44 relative to central bore 25 of chuck 10. Such axial movement further displaces diaphragm 39 via movable member 44 and actively imposes additional radial bias to cantilevered jaws 37, thereby further mechanically tightening the clamping forces on workpiece W.

The gap between lower surface 61 of piston 60 and outer face 26 can be specified to limit the additional amount of mechanical force imposed during this active clamping procedure. Moreover, the additional active clamping force is imparted by draw bar movement at a work station of the machine tool, and no additional hydraulic, pneumatic or other power sources need be attached to chuck 10. Where additional mechanical clamping forces are not needed for particular machining operations, the second phase or further stroke of the draw bar mechanism 14 can simply be omitted without any need to modify any tooling structure.

Upon unclamping motion of draw bar mechanism 14 along longitudinal axis L, diaphragm 39 will automatically return to its initial or preloaded condition, and the additional mechanical clamping forces will be discontinued. Thereafter, chuck 10 can be withdrawn from spindle 12 and removed from the machining station as desired. A pressure port 64 is illustrated in chuck body 20 for assisting in opening jaws 37 to open chuck 10 at a workpiece loading/unloading station. Particularly, pneumatic pressure might be provided via pressure port 64 and exhaust port 65, whereby piston 60 can be moved outwardly and movable member 44 (e.g., sleeve 46, nut 45, and ring 47) will allow jaws 37 to expand radially outwardly to open chuck 10.

An optional workpiece alignment device 70 is also shown in a form of a well-known disappearing alignment pin. Alignment device 70 might be preferred for preliminary alignment of workpiece W as it is placed within jaws 37. One or more biasing means (e.g., spring 82) may also be preferred to provide a predetermined preload force on jaws 37.

Figure 3:
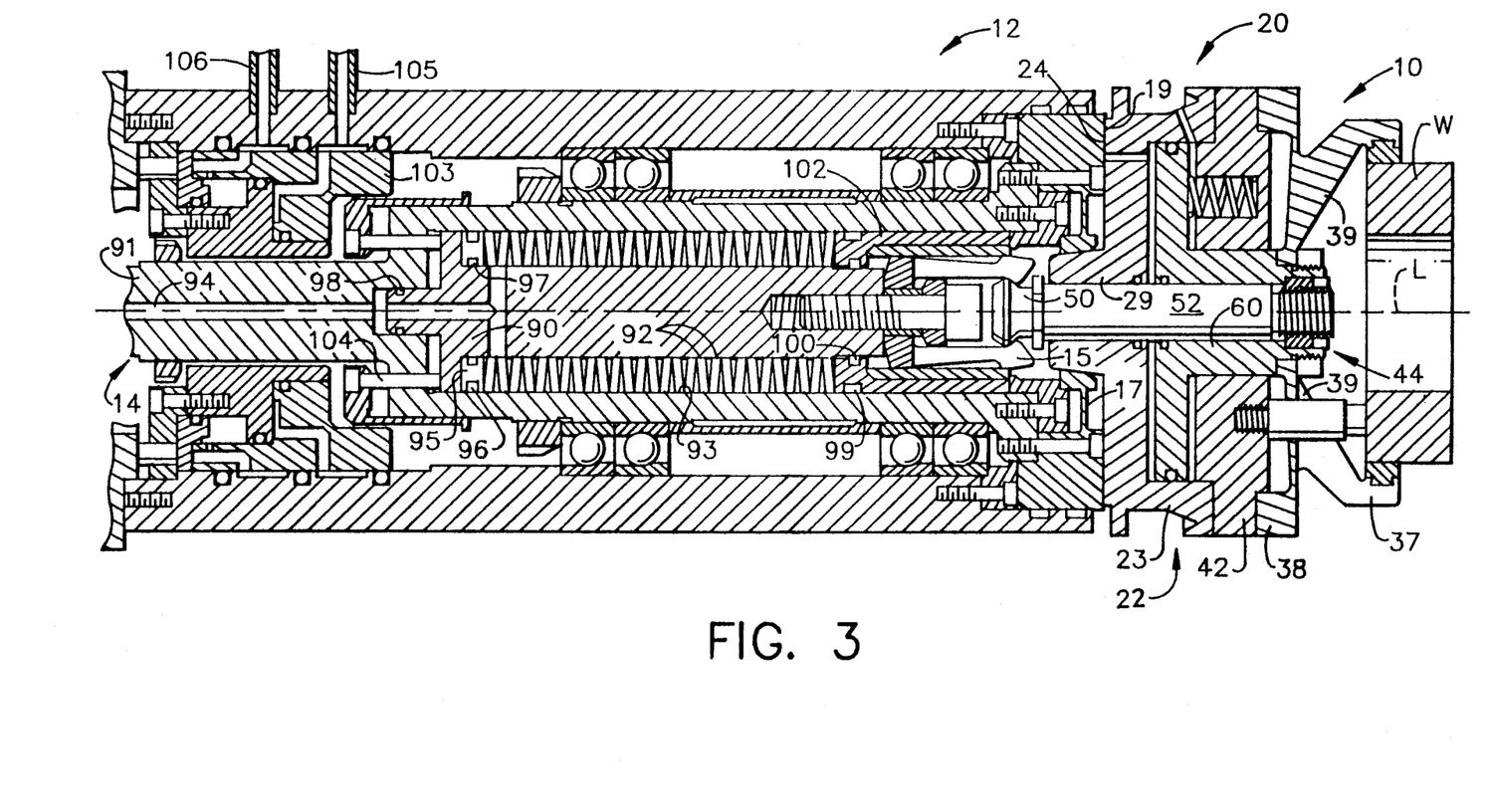
FIG. 3 is a partial cross-sectional view of a preferred clamping chuck and draw bar assembly including a hydraulic second phase power assist arrangement.

FIG. 3 illustrates a partial, simplified cross-sectional view of machine tool spindle 12 including draw bar mechanism 14. The spindle 12 illustrated is intended to represent a machining station of a machine tool, wherein various machining operations can be undertaken. Clamping chuck 10 is also illustrated in FIG. 3 as being clamped with its inner face 24 adjacent gauge line 19. Draw bar mechanism 14 is illustrated in clamped condition with its gripper fingers 15 tightly held within clamping groove 56 of stud 50. Draw bar spindle 90 and draw bar 91 are illustrated as relatively standard draw bar mechanisms, wherein a plurality of Belleville springs 92 are arranged about the periphery of draw bar spindle 90.

In order to accommodate the second phase or further stroke of draw bar assembly 14 beyond the initial clamping stroke, a reciprocable piston 95 including a peripheral seal 96 and an inner O-ring seal 97 is provided at the left end of the stack of Belleville springs 92. Piston 95 is designed for axial movement in a direction parallel to longitudinal axis L, as will be seen. A corresponding O-ring 99 and seal 100 are provided about the inner ends of bushing 102 to provide a substantially sealed pressure cylinder or chamber 93 adjacent draw bar spindle 90 and Belleville springs 92.

A peripheral seal 98 is also provided between draw bar spindle 90 and draw bar 91 to accommodate the additional axial movement of draw bar spindle 90 during the further or second phase stroke. A pressure (e.g., hydraulic) line 94 is provided through draw bar 91 and spindle 90, and when additional mechanical clamping is desired for machining operations, pressure can be provided therethrough to cylinder 93. Increased pressure within sealed chamber 93 tends to force piston 95 in a rearward direction along longitudinal axis L, thereby correspondingly axially displacing clamping stud 50, axially movable member 44, and diaphragm 39. This further or second phase stroke of the draw bar assembly thereby actively increases the radial clamping pressure imposed via jaws 37. Upon release of the pressure within sealed chamber 93, the active additional mechanical clamping forces imposed on workpiece W are correspondingly released. As is common in draw bar arrangements, Belleville springs 92 normally provide relatively strong clamping forces to gripper fingers 15.

In order to move gripper fingers 15 in a forward direction along axis L for release of chuck 10, springs 92 must be compressed. FIG. 3 illustrates an outer cylindrical piston 103 associated with an unclamp pressure fitting (e.g., 105 and/or 106) for assisting in release procedures. Particularly, hydraulic or pneumatic pressure applied through fitting 105 will tend to force piston 103 in a forward direction, in turn reciprocating release pins 104 in a forward direction to compress springs 92 and move draw bar spindle 90 to release gripping fingers 15 from clamping recess 56. As can be appreciated, the standard operation of draw bar assembly 14 has not been modified, and the second phase or further stroke of such assembly is accomplished with relatively minimal modifications at the machine working station. Supplemental clamping pressure is selectively provided without a need for cumbersome attachment of hydraulic or power line to removable chuck 10. Pressure line 94 can be provided through a conventional rotary union connection through the center of the draw bar assembly at the machining station, and can be activated whenever additional mechanical clamping forces are necessary or desirable.

Figure 2:
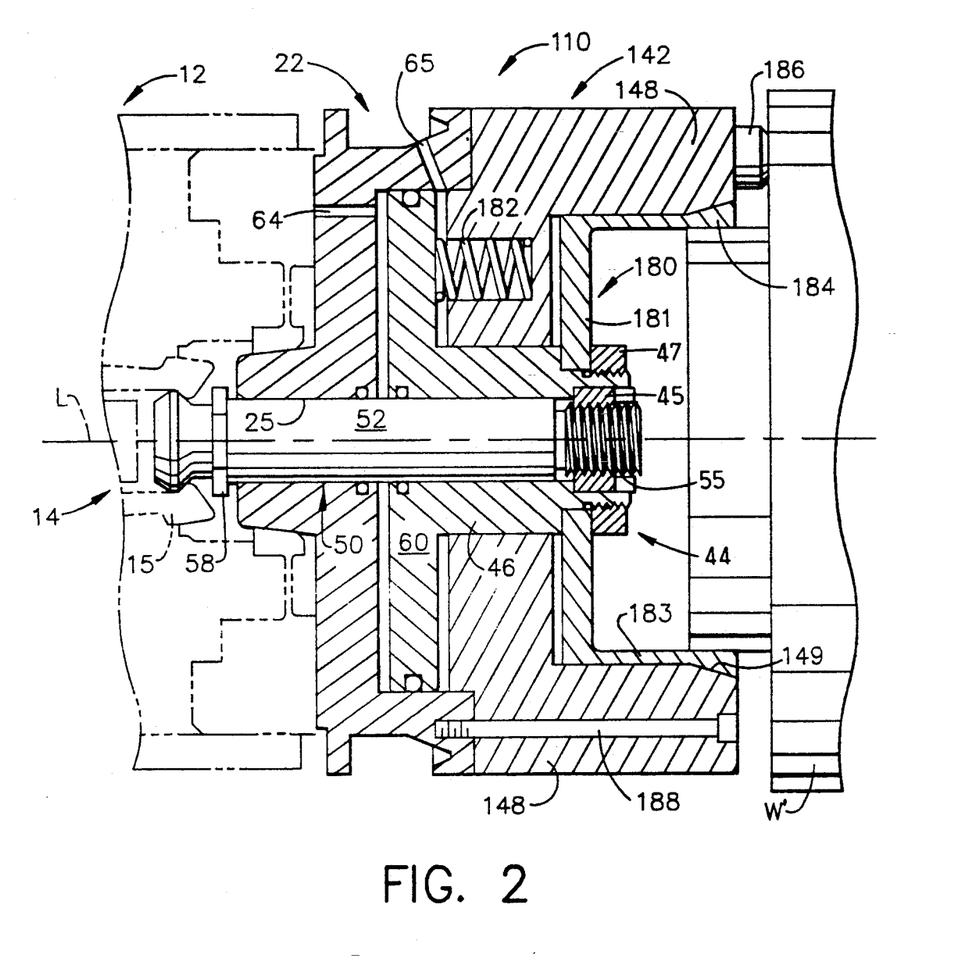
FIG. 2 is a partial cross-sectional view of an alternate preferred embodiment of a quickly interchangeable clamping chuck and draw bar assembly of the present invention.

FIG. 2 illustrates an alternate preferred embodiment of a clamping chuck 110 made in accordance herewith. Particularly, clamping chuck 110 includes substantially the same chuck base 22 of chuck 10 described above, and piston 60 having axially movable sleeve 46 integrally attached thereto. As illustrated, sleeve 46 is integrally formed with or otherwise attached to the upper surfaces of piston 60 to receive clamping stud 50, and comprises recess 68 to receive nut 45 in a countersunk arrangement. Spacer 142 is connected to base 22 (such as via bolts 188) and includes an upstanding cylindrical wall 148 having a substantially cylindrical internal recess with an outwardly beveled upper edge 149. A limit device or clamping seat 186 is also provided on the upper portion of spacer 142. It is contemplated that spacer 142 can be substituted in a modular fashion for the previously described spacer 42 of the first embodiment.

A power clamp 180 is similarly substituted for the diaphragm 39 shown in FIG. 1, and comprises a clamping piston 181 connected via a plurality of clamp connectors 183 to a corresponding plurality of clamping wedges 184 located adjacent beveled edge 149. As will be understood, clamping wedges 184 provide internal radial clamping force similar to the jaws 37 described above, and can comprise a number of spaced units or substantially ring-like semicircular elements.

Power clamp 180 is connected for reciprocation with piston 60 by retainer ring 47, and a biasing means 182 (e.g., a compression spring) is preferably provided between piston 60 and spacer 142 to provide a predetermined preload or passive clamping force to power clamp 180. This initial preload enables passive radial clamping of a workpiece W' to hold the workpiece in position during various chuck loading and unloading excursions, as well as for light grip or low rpm machining operations. As described above, stud 50 can be threadably tightened with respect to movable member 44 to preset the desired preload on power clamp 180, in substantially the same way as jaws 37 were preloaded in the first embodiment. As will be understood, the modular and interchangeable nature of the present chuck provides enhanced adaptability, while minimizing parts inventory required and simplifying adaption procedures.

Operation of clamp 110 is substantially identical to that described above with regard to chuck 10, wherein initial stroke of draw bar assembly 14 clamps chuck 110 to machine tool spindle 12, while further stroke of the draw bar along longitudinal axis L axially displaces clamping stud 150 and movable member 44 relative to bore 25, and such axial movement actively increases the inward radial clamping forces imposed via clamping wedges 184 on workpiece W'. Limit device 186 can be adjustably arranged to maintain the position of workpiece W' relative to chuck 110. Pressure port 64 might similarly be utilized to facilitate opening chuck 110 for release of a workpiece W' or for loading a new workpiece. The draw bar mechanism shown and described with respect to FIG. 3 can be equally utilized with chuck 110 as described above.

Figure 5:
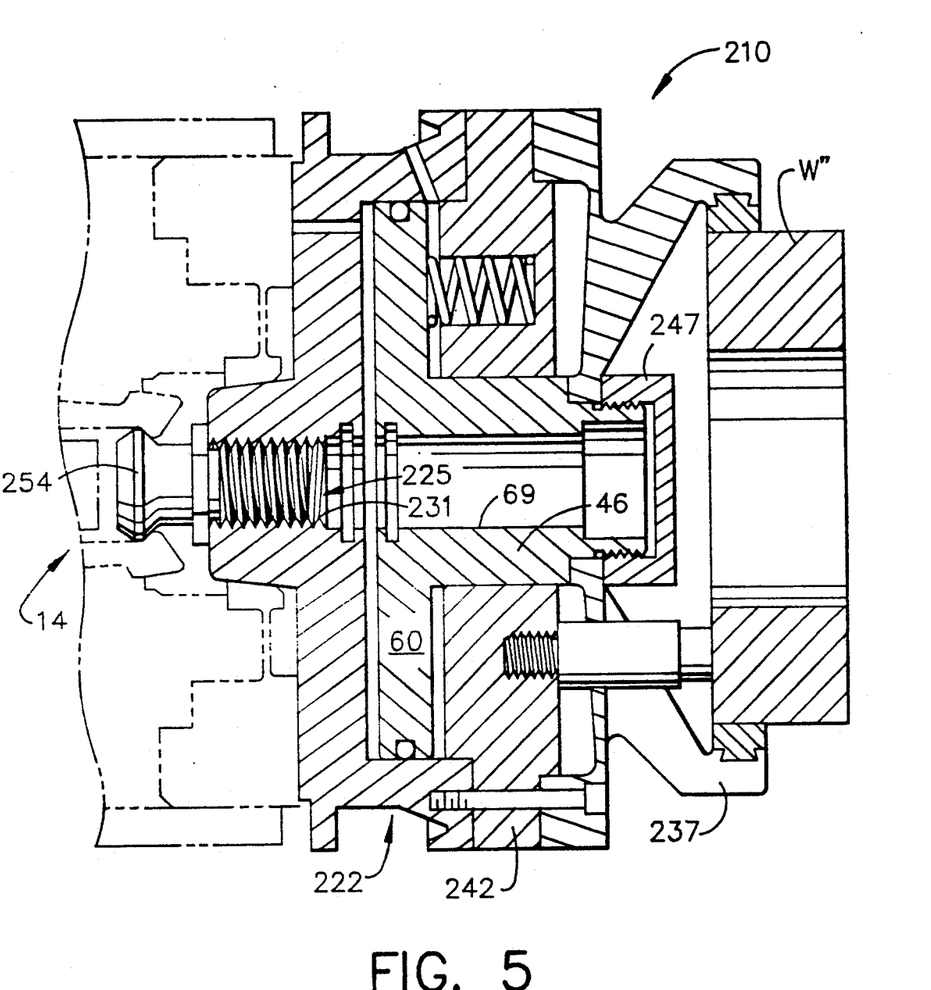
FIG. 5 is a partial cross-sectional view of an alternate embodiment of a clamping chuck and draw bar assembly of the present invention for applications where no additional power assist clamping is needed.

FIG. 5 illustrates the wide adaptability and modular component aspects of the clamping chuck of the present invention, wherein chuck 210 comprises substantially the identical structure shown and described with respect to FIG. 1 above, with the exception that clamping stud 50 of the first embodiment has been replaced by a short pull threaded stub 254. Particularly, the inner lower portion of bore 225 of base 222 has been provided with internal threads 231 to threadably receive the external threads 255 of pull stub 254. Internal threads 231 can be included in standard chuck base parts (e.g., base 22 of FIG. 1) so that no part changes other than substitution of shortened pull stub 254 for clamping stud 50 need be made. A slightly modified retainer cap 247 is also illustrated in place of retainer ring 47, to both connect jaws 37 to piston 60 and to close inner bore 69 from debris and the like. In this way, the number of alternate parts required in inventory is minimized, and interchange is simplified.

The embodiment shown in FIG. 5 might be useful in applications where additional power assist clamping forces are not needed, and where passive preload forces imposed by preset tightening of plug 245 on to sleeve 46 are sufficient to hold a workpiece W" in clamped position for both loading/unloading procedures and machining operations.

Figure 6:
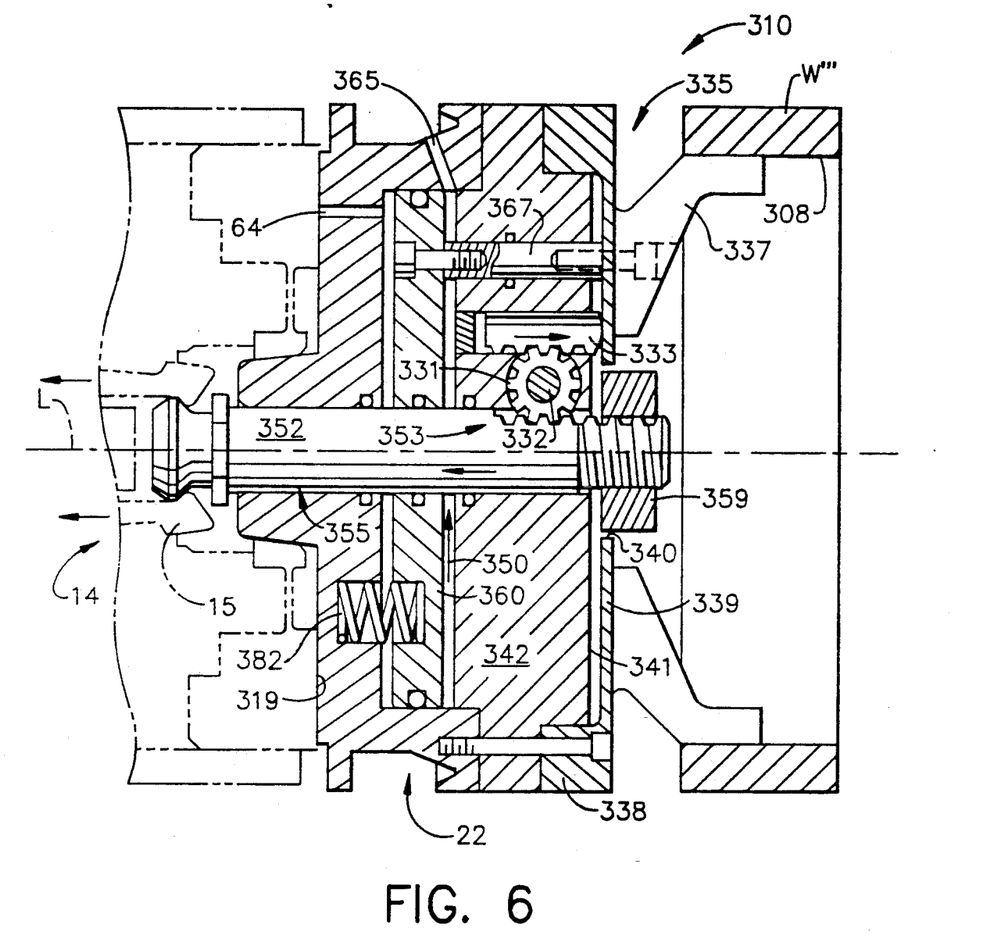
FIG. 6 is a partial cross-sectional view of yet another preferred embodiment of a clamping chuck and draw bar assembly of the present invention, illustrating an internal radial clamping arrangement.

Finally, FIG. 6 illustrates yet another preferred embodiment of a clamping chuck 310 which can similarly be utilized with the same modified draw bar mechanism 14 described above. Chuck 310 has many of the same parts and physical characteristics as chuck 10 described above with regard to FIG. 1, however, is designed to provide internal radial gripping of a workpiece W'''. Particularly, workpiece clamping device 335 comprises a diaphragm 339 having a peripheral support ring 338 very similar to that described with respect to FIG. 1 above. Diaphragm 339, however, is displaced in an outward direction in response to a further stroke in an inward direction along longitudinal axis L of the draw bar mechanism 14. Particularly, inward axial movement of clamping stud 350 is translated into outward axial flex of diaphragm 339 via the double rack and pinion arrangement illustrated.

Particularly, shank 352 of stud 350 is provided with gear teeth or "rack" 353 meshed with pinion 331 which rotates about axis 332 journaled within spacer 342 to transfer such movement to alternately reciprocable rack 333. Spacer 342 is modified to carry pinion 331 and to accommodate reciprocable rack 333, whereby axial movement imposed by further stroke of draw bar mechanism 14 actively imposes outward radial clamping forces to jaws 337. Diaphragm 339 is provided with a central bore 340 to accommodate, without interference, an adjustment nut 359, which can be utilized to prevent overstressing of diaphragm 339 by providing a limit to axial displacement of stud 350 along longitudinal axis L. During displacement, nut 359 will encounter stop face 341, thereby limiting further movement and seating chuck 310 against gauge line 319.

Piston 360 can be directly attached (e.g., such as via attachment 367) to jaws 337, to assist in release procedures, wherein pressure is supplied via pressure port 64 through chuck base 22 to assist release of jaws 337 from workpiece W'''. One or more biasing means 382 may also be preferred to provide a predetermined amount of preclamping force to jaws 337. As also illustrated, it may be preferred to provide clamping stud 350 with a key/keyway arrangement 355 to insure proper orientation and alignment of stud 350, its rack 353, and pinion 331.

Having shown and described the preferred embodiments of the present invention, further adaptions of the quickly interchangeable clamping chuck and draw bar arrangement described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

I claim:

1. A quickly interchangeable clamping chuck and draw bar assembly including mechanical power assist clamping capabilities for use in a machine tool, said assembly comprising:
   a draw bar having a gripping device for releasably receiving and clamping a clamping stud of a machine tool part, said draw bar arrangement being reciprocable along a longitudinal axis to alternately clamp and release said gripping device, and having a two phase clamping stroke;
   a quickly interchangeable clamping chuck having a chuck body with inner and outer faces and a bore extending therebetween;
   means located adjacent said inner face of said body for preliminarily aligning said chuck with said longitudinal axis;
   an axially movable member supported by said body for longitudinal reciprocation relative thereto;
   at least one workpiece clamping device for receiving and clamping a workpiece, said clamping device comprising means for passively clamping a workpiece in clamped position and being connected to said movable member;
   a clamping stud having inner and outer ends and connected to said movable member such that movement of said clamping stud in an inward direction along said longitudinal axis will correspondingly move said movable member; and
   quick release means attached adjacent said inner end of said stud for receiving said draw bar gripping device, whereby the first phase of the stroke of said draw bar provides clamping between said gripping device and said stud, and further longitudinal movement during the second phase of said draw bar stroke axially displaces said clamping stud and said movable member relative to said bore to further mechanically tighten said workpiece clamping device.

2. The clamping chuck of claim 1, wherein said means for preliminarily aligning said chuck with said longitudinal axis comprises a tapered polygon alignment pin.

3. The interchangeable chuck of claim 1, wherein said movable member comprises a diaphragm which is axially flexible along said longitudinal axis, and wherein said workpiece clamping device comprises a plurality of radially movable jaws attached to said diaphragm.

4. The interchangeable chuck of claim 1, wherein said movable member comprises a piston reciprocably supported at least partially within said body, and said clamping device comprises a peripheral clamping wedge arrangement connected to said piston.

5. The interchangeable chuck of claim 1, wherein said workpiece clamping device comprises means for radially clamping a workpiece, wherein said clamping means is normally biased to its clamped position to passively hold a workpiece in position, and wherein said axial displacement of said clamping stud and said movable member powers said radial clamping means to actively further mechanically tighten said workpiece therewithin.

6. The interchangeable chuck of claim 5, wherein said clamping means comprises a plurality of radially movable jaws.

7. The interchangeable chuck of claim 6, wherein said jaws provide external radial gripping of a workpiece.

8. The interchangeable chuck of claim 6, wherein said jaws provide internal radial gripping of a workpiece.

9. A quickly interchangeable clamping chuck including power assist clamping capabilities for use in a machine tool having a draw bar with a releasable gripping device which is reciprocable along a longitudinal axis, said chuck comprising:
   a body having inner and outer faces and a bore extending therebetween;
   means located adjacent said inner face of said body for aligning said chuck with said longitudinal axis;
   an axially movable member supported by said body for longitudinal reciprocation relative thereto, wherein said movable member contacts a diaphragm which is axially flexible along said longitudinal axis;
   at least one workpiece clamping device connected to said movable member for receiving and clamping a workpiece, said workpiece clamping device comprising a plurality of radially movable jaws attached to said diaphragm;
   a clamping stud having inner and outer ends and connected to said movable member such that movement of said clamping stud in an inward direction along said longitudinal axis will correspondingly displace said movable member; and
   quick release means attached adjacent said inner end of said stud and extending inwardly from said inner face for receiving said draw bar gripping device, whereby an initial stroke of said draw bar clamps said chuck to said machine tool, and a further stroke of said draw bar along said longitudinal axis axially displaces said clamping stud and said movable member relative to said bore to further mechanically tighten said workpiece clamping device.

10. A quickly interchangeable clamping chuck including power assist clamping capabilities for use in a machine tool having a draw bar with a releasable gripping device which is reciprocable along a longitudinal axis, said chuck comprising:
- a body having inner and outer faces and a bore extending therebetween;
- means located adjacent said inner face of said body for aligning said chuck with said longitudinal axis;
- an axially movable member supported by said body for longitudinal reciprocation relative thereto, wherein said movable member is attached to a clamp piston reciprocably supported at least partially within said body;
- at least one workpiece clamping device connected to said movable member for receiving and clamping a workpiece, said clamping device comprising a peripheral clamping wedge arrangement connected to said piston;
- a clamping stud having inner and outer ends and connected to said movable member such that movement of said clamping stud in an inward direction along said longitudinal axis will correspondingly displace said movable member; and
- quick release means attached adjacent said inner end of said stud and extending inwardly from said inner face for receiving said draw bar gripping device, whereby an initial stroke of said draw bar clamps said chuck to said machine tool, and a further stroke of said draw bar along said longitudinal axis axially displaces said clamping stud and said movable member relative to said bore to further mechanically tighten said workpiece clamping device.

11. A quickly interchangeable clamping chuck including power assist clamping capabilities for use in a machine tool having a draw bar with a releasable gripping device which is reciprocable along a longitudinal axis, said chuck comprising:
- a body having inner and outer faces and a bore extending therebetween;
- means located adjacent said inner face of said body for aligning said chuck with said longitudinal axis;
- an axially movable member supported by said body for longitudinal reciprocation relative thereto;
- at least one workpiece clamping device connected to said movable member for receiving and clamping a workpiece, said workpiece clamping device comprising means for radially clamping a workpiece, said clamping means normally biased to passively hold a workpiece in clamped position;
- a clamping stud having inner and outer ends and connected to said movable member such that movement of said clamping stud in an inward direction along said longitudinal axis will correspondingly displace said movable member; and
- quick release means attached adjacent said inner end of said stud and extending inwardly from said inner face for receiving said draw bar gripping device, whereby initial and further stroke of said draw bar along said longitudinal axis axially displaces said clamping stud and said movable member relative to said bore and powers said radial clamping means to actively further mechanically tighten said workpiece therewithin.

12. The interchangeable chuck of claim 11, wherein said clamping means comprises a plurality of radially movable jaws.

13. The interchangeable chuck of claim 12, wherein said jaws provide external radial gripping of a workpiece.

14. The interchangeable chuck of claim 12, wherein said jaws provide internal radial gripping of a workpiece.

* * * * *